United States Patent [19]

Kärnä et al.

[11] Patent Number: 4,878,020
[45] Date of Patent: Oct. 31, 1989

[54] METHOD AND DEVICE FOR MEASURING THE DISTANCE BETWEEN THE DISCS OF A REFINER USING A MEASUREMENT OF THE MAGNETIC FLUX INDUCED BETWEEN THE DISCS

[75] Inventors: Juhani Kärnä; Heikki Pahlman, both of Tampere, Finland

[73] Assignee: Sunds Defibrator Jylha Oy, Valkeakoski, Finland

[21] Appl. No.: 207,156
[22] PCT Filed: Sep. 30, 1987
[86] PCT No.: PCT/FI87/00132
 § 371 Date: Jun. 14, 1988
 § 102(e) Date: Jun. 14, 1988
[87] PCT Pub. No.: WO88/03054
 PCT Pub. Date: May 5, 1988

[30] Foreign Application Priority Data

Oct. 31, 1986 [FI] Finland ............................ 86443

[51] Int. Cl.$^4$ ........................... B02C 7/14; G01B 7/14
[52] U.S. Cl. ........................... 324/207; 241/37; 324/226
[58] Field of Search ............... 324/207, 208, 226, 229, 324/232, 239, 240, 242, 243; 241/37, 259.1

[56] References Cited

U.S. PATENT DOCUMENTS

| | | | |
|---|---|---|---|
| 2,467,306 | 4/1949 | Habig | 324/242 |
| 2,548,599 | 4/1951 | Garr | 241/37 |
| 3,434,670 | 3/1969 | May | 241/37 |
| 3,500,179 | 3/1970 | May | 241/37 X |
| 4,387,339 | 6/1983 | Akerblom | 324/207 |
| 4,627,578 | 12/1986 | Whyte | 241/37 X |
| 4,673,875 | 6/1987 | Kjellqvist et al. | 241/37 X |
| 4,785,243 | 11/1988 | Abramczyk et al. | 324/242 X |
| 4,804,912 | 2/1989 | Lysen | 324/207 |

FOREIGN PATENT DOCUMENTS

| | | |
|---|---|---|
| 73078 | 4/1987 | Finland . |
| 401896 | 6/1978 | Sweden . |
| 414457 | 9/1978 | Sweden . |

*Primary Examiner*—Gerard R. Strecker
*Attorney, Agent, or Firm*—Browdy and Neimark

[57] ABSTRACT

This invention is related to a method and device for measuring the distance ($\delta$) between the discs of a refiner, in which method a magnetic field is generated by means of a coil (5) placed at one disc (4), which magnetic field is allowed to run at least partly through the other disc (3). According to the invention the measuring is carried out by using the actual distance between the refiner discs as the object of measuring in that the magnetic flux over the distance between the discs caused by the coil (5), which is formed at least at one refiner-disc tooth (7) or comparable element, is measured such that the flux running over the distance between two opposite teeth (7,8) is detected by means of another coil (6), such as is formed round at least either of said teeth, the signal induced in the coil being interpreted as a quantity that expresses the distance ($\delta$) between the teeth.

19 Claims, 3 Drawing Sheets

METHOD AND DEVICE FOR MEASURING THE DISTANCE BETWEEN THE DISCS OF A REFINER USING A MEASUREMENT OF THE MAGNETIC FLUX INDUCED BETWEEN THE DISCS

BACKGROUND OF THE INVENTION

1. Field of the Invention

This invention is related to a method and device for measuring the distance between the discs of a refiner, in which method a magnetic field is generated by means of a coil placed at one disc, which magnetic field is allowed to run at least partly through the other disc.

2. The Prior Art

Measuring the distance between, for instance, the discs of a disc refiner has chiefly two purposes. Firstly, the aim is to prevent the discs from accidentally getting closer to each other and finally colliding, which is caused by the yielding of the refiner, its wearing and other factors, because this way the valuable discs wear quickly and might also easily get destroyed altogether. Secondly, measuring the distance between the discs provides valuable information about the process itself, and it is possible to see, for instance, what distance between the discs gives the desired final result and adjust the distance according to the quality of the final product already at the beginning of the process. This way costly experiments are avoided.

In each case the equipment for measuring the distance between the discs has to meet high requirements because it has to work under great pressure and reliably measure distances no bigger than fractions of a millimeter in a vibrating machine. Known devices for measuring the distance between the discs are based either on indirect measuring, or on the use of sensors for detecting the distance between the discs, or on capacitative measuring.

On example of indirect measuring is the measuring of the axial movement of the discs. The axial movement of the discs is in principle proportional to changes in the distance between the discs in a disc refiner, and the same rule applies also to a cone refiner. The yielding of the refiner under varying forces and pressures and the wearing of all parts between the discs' mutual distance and the indirect measuring point, however, make the results of the measurement unreliable. Besides, this kind of measuring does not provide information about the wearing of the disc surfaces themselves, in other words their condition.

Another way to measure the distance between the discs is to use built-in approach sensors which, installed in one disc, measure the distance between the opposite disc and themselves, as described in Finnish patent application No. 801748. Both in the invention presented by means of that patent application and in the description of prior art, the point of departure is the measuring of the distance between smooth surfaces, which measuring is problematic. In the case of said invention further problems are the discs' wearing and the resultant changes in their mutual distance. As the sensors do not wear in the same way as the disc material, if at all, they are certainly not able to take into consideration the wearing of the disc in which they are mounted. A third way of measuring referred to is to measure the capacitance between the discs and its changes, on the basis of which, for instance, in a disc refiner the average distance between the rotor disc and the stator disc can be determined. yet the capacitance measured is also influenced by several other factors, such as the chemical properties of the woodpulp to be ground and of the dilution water. Thus the results are very easily distorted; consequently, no practical applications of this method are known to be in the market. Besides, it is impossible to measure the angle between the discs with this method only.

In addition to the above-mentioned problems, all above-mentioned methods are burdened by difficulties of calibration because the absolute location of the measuring points needed for calibration or their location in relation to the discs is constantly changing as time goes on.

SUMMARY OF THE INVENTION

The object of this invention is to create a method and device for measuring the distance between the discs of a refiner without the above-mentioned drawbacks. To achieve this, a method according to the invention is characterized by carrying out the measuring by using the actual distance between the refiner discs as the object of measuring in that the magnetic flux over the distance between the discs caused by the coil, which is formed at least at one refiner-disc tooth or comparable element, is measured by that the flux running over the distance between two opposite teeth is detected by means of a coil, such as is formed round at least either of said teeth, the signal induced in the coil being interpreted as a quantity that expresses the distance between the teeth.

The most significant advantages of the invention are the following:

the actual critical parts of the discs are used for the measuring of the distance between the discs, which gives the real value irrespective of the discs' wearing and the refiner's yieldings. The accurate measuring method also creates opportunities for a soundly utilizable multi-point measuring, with which the obliquity of the positions of the discs in respect to each other can be determined.

It is to be noted that because the measuring in the invention is based on the measuring of a magnetic field the materials between the discs (water, wood chips), being magnetically not conductive, do not influence the results.

An advantageous application of the invention is characterized by feeding a three-wave, that is sawtooth voltage into the coil that generates the magnetic field.

From this kind of amplitude of an easily modifiable signal it is possible to read the distance between the discs as a quantity reversely proportial to the amplitude.

Another advantageous application of the invention is characterized by carrying out the calibration of the measuring device by measuring the corresponding signal levels with the discs in the extreme positions in relation to each other and by recording said signal levels into a memory.

the difficulty of calibration which burdens devices based on prior art are eliminated from a solution provided by the invention partly through the absolute method of measurement and partly through the utilization of such electronic equipment as is in agreement with the application described above.

BRIEF DESCRIPTION OF THE DRAWINGS

In the following, the invention is explained in more detail by means of an example with reference to the enclosed drawings, in which.

DETAILED DESCRIPTION OF THE PREFERRED EMBODIMENTS

Figure 1:
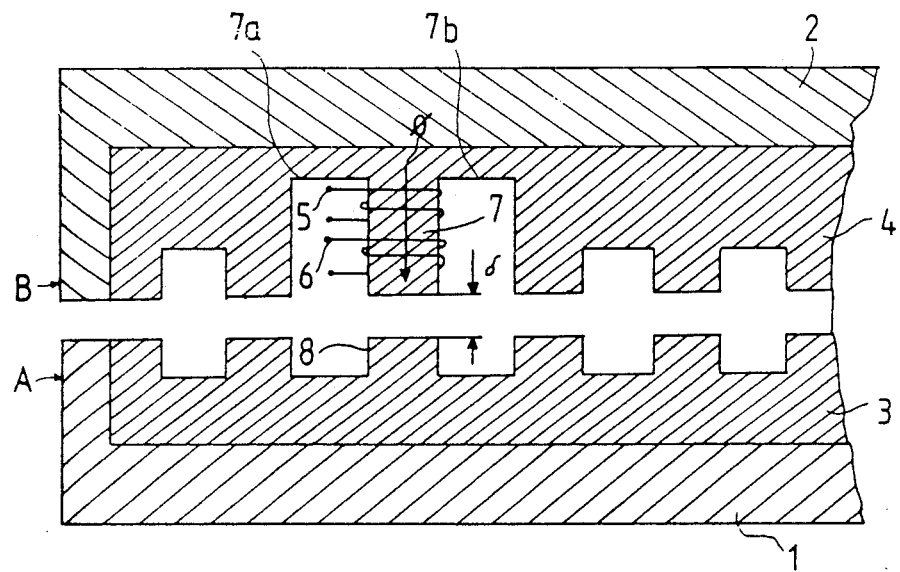
FIG. 1 shows an advantageous application of the invention.

FIG. 1 shows a cross-section along the outer circles of the discs of a disc refiner. In a situation like that in the figure, the teeth of the two discs are positioned opposite each other. The base plates of the rotor and of the stator are denoted with numbers 1 and 2 respectively. Likewise, the rotor and stator discs are denoted with numbers 3 and 4 respectively. In one disc, in this case the stator disc 4, cavities 7a and 7b have been machined surrounding one tooth 7. Round the tooth 7 has then been formed a coil 5, and into that coil is fed sawtooth voltage. The coil compels the magnetic flux caused by it to run as effectively as possible through the magnetic body in the field, in this case the refiner-disc tooth 7 in the coil.

If the wearing properties of the base plates 1,2 of the rotor and of the stator respectively are close enough to the wearing properties of the actual disc material, the coils can also be placed at the locations A or B of the base plates, which form the outer circles of the respective refiner discs. This has the advantage that the coils are readily accessible for instance for maintenance.

Figure 2:
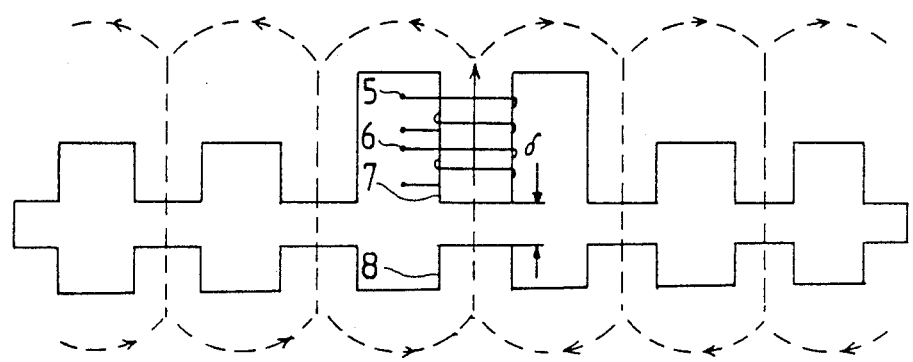
FIG. 2 shows the field lines of the most important routes of the magnetic flux in a case like that in FIG. 1.

In FIG. 2 dashed lines show how the magnetic flux runs in a case like that in FIG. 1. It is seen, that there arises at every tooth a closed magnetic field which because of the shape of the discs has an air gap. The total flux runs through the tooth that is equipped with the coil. The flux returns through all the other teeth in the magnetic circuit, of which the disc has a great number. The coil 5 corresponds to the primary coil of an iron-cored transformer and the flux induced by it creates a voltage in the other coil 6, which in turn corresponds to the secondary coil of a transformer. For reasons explained later on, the coils 5, 6 do not, however, operate as a transformer. The coils 5, 6 can be one and the same coil.

Magnetic flux $\phi$ is proportional to the permeance of the magnetic circuit:

$$\phi = N \cdot i \cdot \mu_0 \frac{A}{\delta} = N \cdot i \cdot P \quad (1)$$

in which
N=number of revolutions of the primary coil
i=current of the coil
$\mu_0$=permeability of free space, defined as $4\pi 10^{-7}$ H/M
A=area of the material permeated by the flux
$\delta$=(delta) distance between the discs (in this case)
P=permeance.

In a circuit like that in FIG. 1 the permeance of the circuit can be divided into two components:

$$P = \mu_0 \cdot \frac{A_h}{\delta} + \mu_0 \cdot n \cdot \frac{A_h}{\delta} \quad (2)$$

in which A=area of one refiner-disc tooth.

the contribution of iron has been left out of the equation. The components represent the permeance of the air gap permeated by the main flux and the permeance of the air gaps of the flux that returns through the other teeth (n pcs). As permeance is the inverse of reluctance, we get $$P = \frac{1}{R} + \frac{1}{n \cdot R} \quad (3)$$

from which follows that $$P \rightarrow \frac{1}{R},$$

when n→∞

Thus, according to this only the air gap at the coil tooth 7 is decisive.

The flux received by the coil 6 is reversely proportional to the distance $\delta$ between the refiner-disc teeth 7 and 8 because an increase in the distance also means an increase in magnetic reluctance, in other words in the resistance in the closed circuit where the magnetic flux runs. The invention is based on the very idea that utilization of refiner-disc teeth for creating a magnetic circuit and the detection at a tooth 7 itself of the flux changes in one such magnetic circuit provide such a field intensity and precision as can be measured without the drawbacks that occur when measuring the distance between planar surfaces. Besides, what is measured all the time is the actual distance between the discs, since the changes in the distance between the refiner-disc teeth are directly reflected in the measurements, irrespective of why the changes occur (inner yieldings of the refiner, wearing).

when the rotor of the refiner rotates in relation to the stator, the magnetic flux naturally changes cyclically because the magnetic resistance between the teeth, in other words reluctance, is at its lowest when the teeth are precisely opposite each other, at which time the flux correspondingly is at its greatest. This maximum value is the actual result of the measurement, and it can be easily discerned for instance by filtering or with a peak-value detector.

Figure 3:
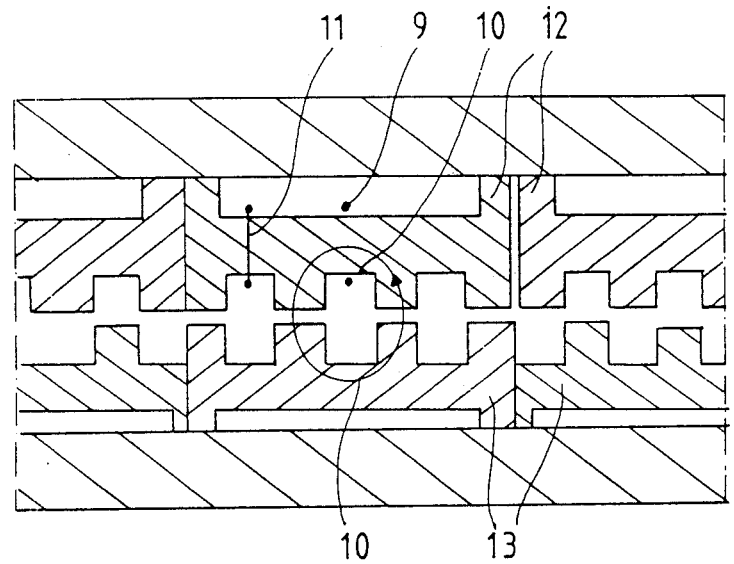
FIG. 3 shows another advantageous application of the invention.

FIG. 3 shows another application of the invention, in which a winding 9 is installed longitudinally in a groove between two refiner-disc teeth. The winding causes the same kind of magnetic circuit as in the former case, as is shown by the flux line 10. This flux can be detected and measured in the same way as that shown in FIG. 1. As a new feature in FIG. 3 is a so-called short-circuit coil 11, with which the flux is prevented from running outside its area of generation. Because of the flux, in the coil 11 is induced a current which in turn reduces the magnetic field that runs through the coil. It is furthermore seen in FIG. 3 that the discs can also consist of separate segments 12, 13, for instance such as can be changed one by one.

Figure 4:
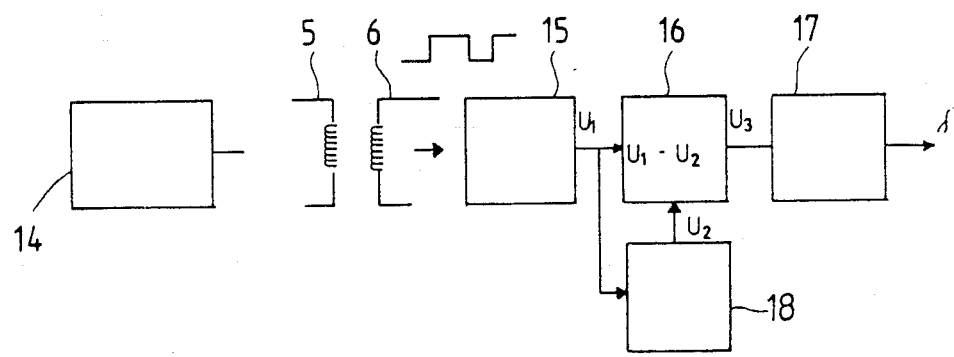
FIG. 4 shows as a block diagram the control electronics of a device according to the invention.

FIG. 4 shows the control electronics of a system according to the invention for measuring the distance between the discs. As already stated above, into the generating coils 5,6 is fed sawtooth voltage. This is because the disc material is not a particularly good ferromagnetic material. Among other things, therefore, this means that it cannot be made crystal-oriented, which is what, for instance, cold-rolled transformer plates mostly are. Owing to this and with an appropriate number of windings of the coils, the flux, in practice, tends to get quickly saturated, which causes the magnetic field to behave derivatively. Thus in this kind of situation, for instance, the coils 5 and 6 and the disc 4 become a derivator, not a transformer. If, in that case, the supply voltage is sawtoothed, the curve form of the output signal of the secondary side will advantageously, for further processing, be that of a square wave, the amplitude of which is reversely proportional to the distance $\delta$ between the discs. As stated earlier, is is possible at the same time to both generate and detect a magnetic field with the coil 5, in which case a separate coil 6 is not necessary. The circuit shown in Figure 4 is not essentially changed by this.

In FIG. 4 a sawtooth voltage generator 14 feeds three-wave voltage into the coil 5. The output signal of the secondary coil 6 of the transformer circuit is, as stated earlier, square wave, and it is rectified in a rectifier 15. The rectified signal $U_1$ is taken into a reduction element 16, in which the signal $U_2$, the stray flux of the magnetic field and the background noise of the rest of the circuit, is subtracted from the signal $U_1$, the result being signal $U_3$. Finally, this signal is corrected in the circuit 17 by means of a coefficient chosen on the basis of the disc material and design, in such a way that the output of the circuit directly represents the distance $\delta$ between the discs. Said coefficient also takes into consideration the dislinearity of the interdependence between the value $\delta$ of the discs' distance from each other and the amplitude of the corresponding square wave, in such a way that the output $\delta$ value is in a direct and linear way dependent on the distance between the discs, which makes eventual further processing as easy as possible. The output signal can be binary or analog. In practice, the circuit 17 can comprise a microprocessor, the advantages of which are easy modifiability of the corrective coefficients and a wide range of possibilities of further processing.

The definition of the background noise $U_2$ and at the same time the calibration of the device happen automatically (no scaling or searching for reference points), in such a way that the discs of the refiner are moved far from each other, for instance to the maintenance position, and the device is allowed to measure the signal that corresponds to this 'indefinite' distance between the discs. The resultant signal, in other words the base voltage $U_2$, which mainly represents the stray flux of the magnetic field, is recorded into a holding circuit 18, so that it in real measurement could be subtracted from the measured signal. Finally, in the calibration the discs are moved together to zero distance, by which means the circuit is informed about the zero position signal characteristic of the disc type. It is thereby possible to form and check the correction coefficient stored in the circuit 17.

Figure 5:
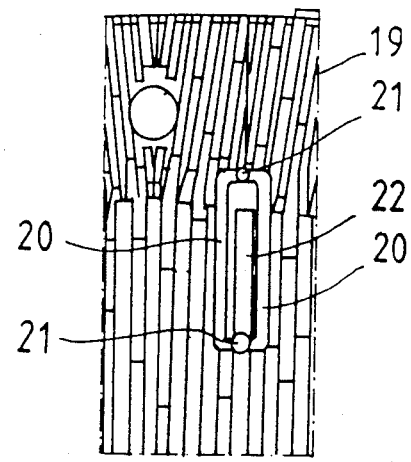
FIG. 5 shows the position of a coil according to the invention at a disc of a disc refiner as seen from line v—v of FIG. 1.

This way, a device according to the invention can be advantageously scaled and calibrated; and because the measuring method is insensitive to the reasons of the changes in the the discs' distance from each other and to the quality and amount of the material between the discs, the calibration generally need not be carried out more than once, when installing the discs. Finally FIG. 5 shows a cross-sectional view taken along line V—V of FIG. 1 of a real situation where a port of a disc section 19 has been provided around a separate refiner-disc tooth 22 with machined grooves 20 and fastening places 21 for the coils. The coils are fastened by screwing through points 21 screws that go through the disc, after which the coils are covered by casting a solid plastic layer over them.

It is obvious to a person skilled in the art that the invention is not restricted to the embodiments described above, but can be varied within the scope of the following patent claims.

We claim:

1. A method for measuring the distance $\delta$ between discs in a refiner, each of said discs having at least one tooth, said method comprising:

generating a magnetic field by means of first coil means formed at least at one refiner-disc tooth of a first disc, said magnetic field being allowed to run at least partly through a second disc, the second disc comprising a tooth;

detecting, by means of a second, coil means formed around the tooth of the first disc, the magnetic flux caused by the first coil means running over the distance between two opposite teeth of the first and second discs, respectively;

outputting a signal representing the detected magnetic flux; and interpreting the signal as a quantity that expresses distance $\delta$ between the teeth.

2. The method according to claim 1, wherein the step of generating comprises the step of generating the magnetic field by a first coil wound around one disc tooth along at least part of its length and the step of detecting comprises the step of detecting the magnetic flux by a separate second coil wound around the one disc tooth.

3. The method according to claim 1, wherein the step of generating comprises the step of generating the magnetic field by a coil which is wound to run through a groove between two teeth and through the rear side of the disc.

4. The method according to claim 1, wherein the step of generating comprises the step of generating the magnetic field by a first coil wound around one disc tooth along at least part of its length and the step of detecting comprises the step of detecting the magnetic flux by a separate second coil wound around the same disc tooth.

5. The method according to claim 1, wherein the steps of generating and detecting respectively comprise the steps of generating and detecting the magnetic field by separate coils which are wound around the same tooth along at least part of its length.

6. The method according to claim 1, wherein the step of generating comprises the step of directing the course of the magnetic field generated by the magnetic coil with short-circuit coils installed at the disc.

7. The method according to claim 1, further comprising the step of performing the above-listed steps of generating, detecting, outputting, and interpreting the distance $\delta$ between the discs of the refiner at more than one location.

8. The method according to claim 1, wherein the step of generating comprises the step of feeding a saw-tooth voltage into the first coil means that generates the magnetic field.

9. The method according to claim 1, wherein the step of outputting comprises the step of measuring, at the output of the second coil means that detects the magnetic field, the amplitude ($U_1$) of a voltage signal that has the shape of a square wave.

10. The method according to claim 1, further comprising the step of calibrating the measuring device comprising the steps of measuring the corresponding signal levels with the discs in the extreme positions in relation to each other and recording said signal levels into a memory.

11. A device for the implementation of claim 1, said device comprises:
   a first coil for the generation of a magnetic field, said first coil being wound at one refiner-disc tooth of one refiner disc;
   a second coil for the detection of the flux running over the distance between two opposite teeth wound to surround at least partly said refiner-disc tooth of said first coil;
   an electronic circuit for the interpretation of the signal induced in said first coil.

12. The device according to claim 11, wherein the first coil that generates the magnetic field and the second coil that detects the magnetic field are wound around the one refiner-disc tooth along at least part of its length.

13. The device according to claim 11, wherein the first coil that generates the magnetic field is wound to run through a groove between two teeth and through the rear side of the disc.

14. The device according to claim 11, wherein the first coil that generates the magnetic field and the second coil that detects the magnetic field are wound around the same refiner-disc tooth along at least part of its length.

15. The device according to claim 11, wherein the first coil that generates the magnetic field and the second coil that detects the magnetic field are wound around the same tooth of either disc along at least part of its length.

16. The device according to claim 11, further comprising short-circuit coils installed at the refiner disc that direct the course of the magnetic field.

17. The device according to claim 11, further comprising several pairs of coils installed at the refiner disc that measure the distance ($\delta$) between the discs of the refiner at more than one location.

18. The device according to claim 11, further comprising a saw-tooth voltage generator for providing voltage to the first coil that generates the magnetic field.

19. The device according to claim 11, wherein the electronic circuit comprises a rectifier, a reduction circuit, a modifying circuit, and a holding circuit for the background noise.

* * * * *